J. E. HEIMERL.
RECEPTACLE FOR MEALS.
APPLICATION FILED NOV. 23, 1918.
1,435,521.
Patented Nov. 14, 1922.
2 SHEETS—SHEET 2.
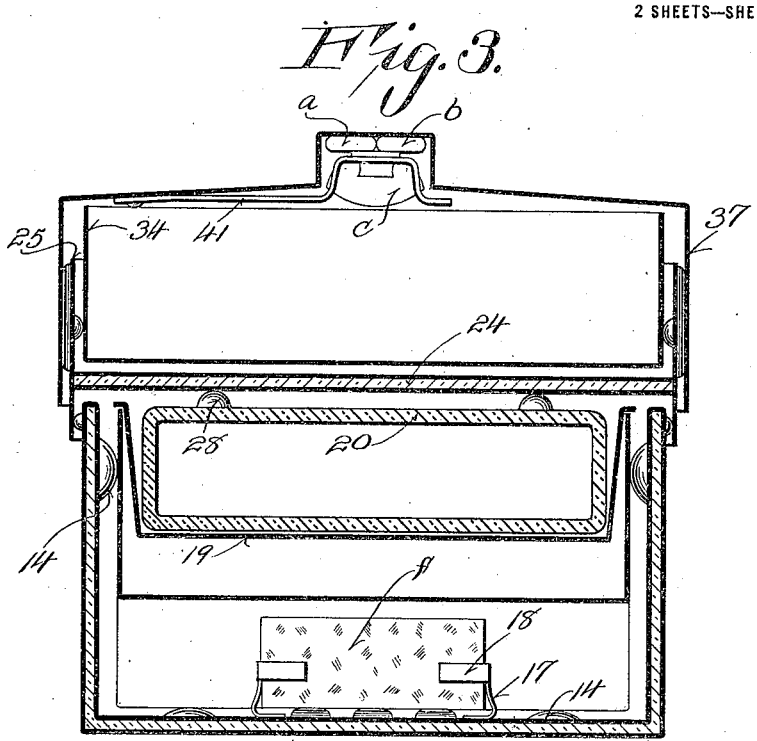
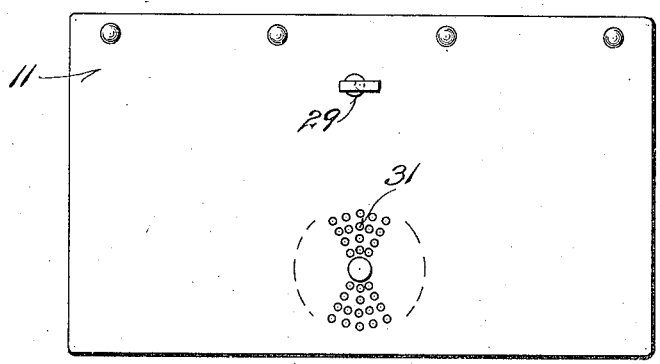
WITNESS
T. F. Britt
INVENTOR
Julius E. Heimerl
BY Young & Young
ATTORNEY Patented Nov. 14, 1922.

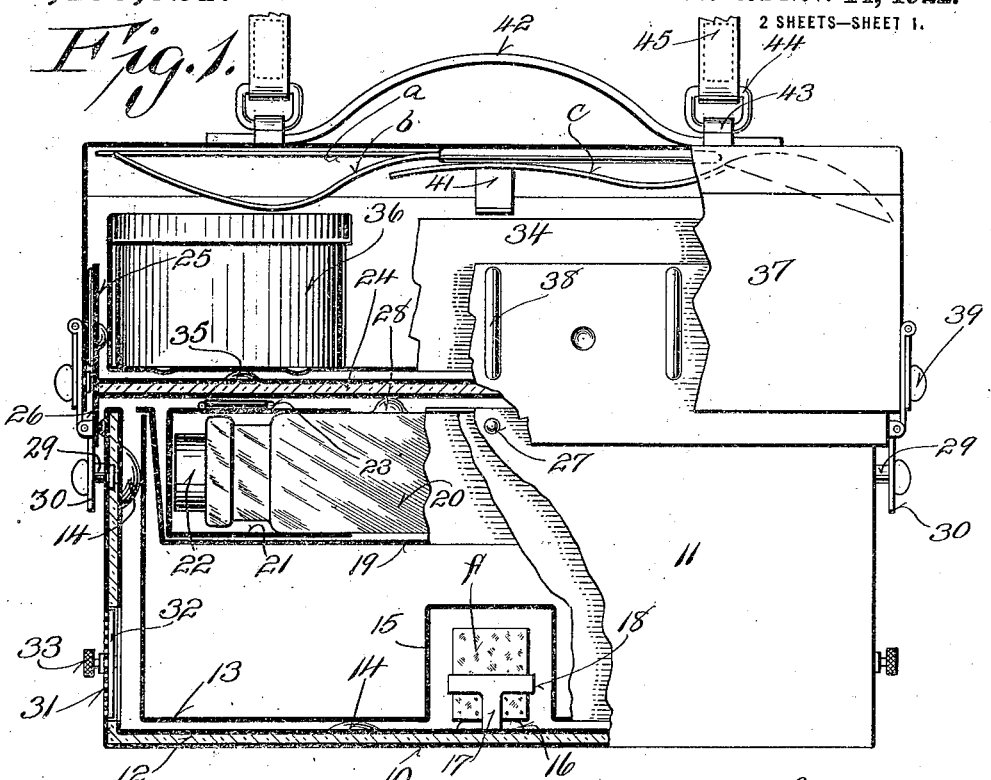
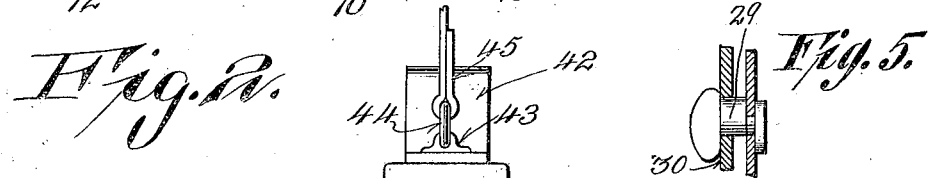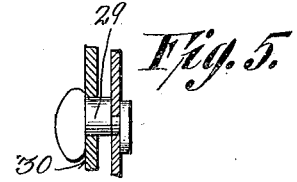
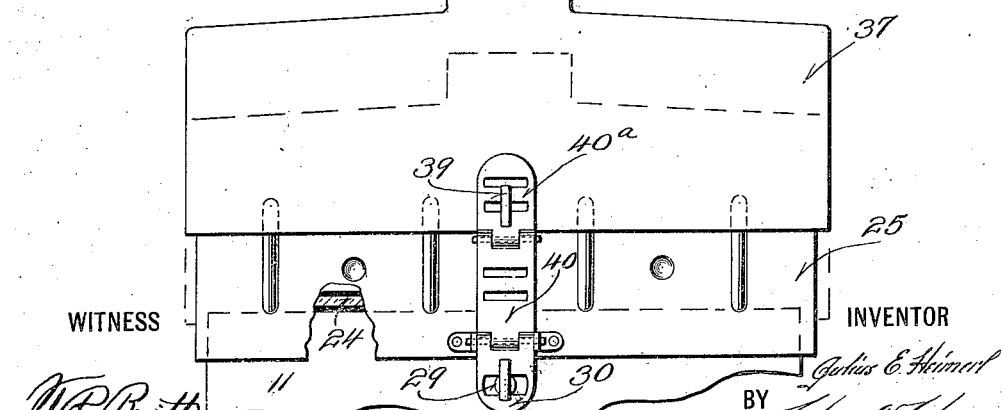

1,435,521

UNITED STATES PATENT OFFICE.

JULIUS E. HEIMERL, OF MILWAUKEE, WISCONSIN, ASSIGNOR TO THE HOT LUNCH BOX CO., OF MILWAUKEE, WISCONSIN.

RECEPTACLE FOR MEALS.

Application filed November 23, 1918. Serial No. 263,889.

*To all whom it may concern:*

Be it known that I, JULIUS E. HEIMERL, a citizen of the United States, and resident of Milwaukee, in the county of Milwaukee and State of Wisconsin, have invented certain new and useful Improvements in Receptacles for Meals; and I do hereby declare that the following is a full, clear, and exact description thereof.

My invention relates to new and useful improvements in heated receptacles for meals, more particularly of that type including separate main chambers for heated and cold foods, the chamber for heated food being provided with a burner and being insulated from the other chamber to prevent transmission of heat thereto.

It is in general the object of my invention to simplify and render more compact the structure of devices of this character, to increase the efficiency and economy of operation and reliability of such devices, and to increase the facility and preferable manner with which the said devices may be manipulated for filling the same, or removing food therefrom.

It is a more particular and important object of my invention to provide a heated receptacle of the aforedescribed type wherein a positive circulation is set up in the cold food compartment, to more fully insure against heat being imparted to food therein from the main heated compartment.

A further object resides in the provision of an arrangement wherein variable circulation of air may be set up in the main heated compartment whereby to control the rate of combustion of fuel therein and consequently to control the temperature of the compartment, and it is more particularly an object to effect this variable circulation by the provision of a cover member for the main compartment which is adjustable toward and away therefrom to provide a variable air outlet space.

A further object resides in the provision of an arrangement whereby the capacity of the cold food compartment may be varied at will.

A still further object resides in the provision of an improved and most compact arrangement for mounting the beverage container of the device in such manner that it receives an adequate degree of heat from the burner, yet may be removed without disturbing the solid food container or exposing the contents thereof.

Experience has demonstrated that in the use of solid fuels, having a charcoal base and confined in close and narrow spaces, such as I desire to employ in my device, a faulty combustion is procured unless a positive current of air is set up adjacent the surface of the fuel, and in my previous Patent No. 1,227,782 granted May 29, 1917, I employ a burner having air guiding wall portions, but such wall portions serve to deflect the heat from the immediately adjacent portions of the food container and also form an additional expense of manufacture. It is hence a further object of my invention to procure a proper current of air adjacent the fuel and at the same time a direct radiation of heat from the fuel against the adjacent food container portions and effect a reduced cost of manufacture.

With the above and other objects and advantages in view, which will be apparent as the description proceeds, my invention resides in the novel features of construction, combination and arrangement of parts as hereinafter more particularly described and defined by the appended claims.

In the accompanying drawings:

Figure 1 is a view of a heated receptacle constructed in accordance with my invention, portions thereof being progressively broken away from a side elevation at one end to a substantially central longitudinal section at the other end.

Figure 2 is an end elevation of the upper portion of my improved receptacle, with the cover of the cold food compartment in raised position.

Figure 3 is a central transverse sectional view through the receptacle, with the cover of the cold food compartment in lowered position.

Figure 4 is an elevational view of the main casing of the receptacle.

Figure 5 is a detail sectional view of one of the eccentric studs for connecting receptacle sections.

Referring now more particularly to the accompanying drawings, there is provided a main casing including a bottom 10 and walls 11, said bottom and walls being preferably formed of a metallic shell filled with asbestos or other suitable insulating material. This casing forms the heated food compartment of the device, and disposed therein is a pan-shaped solid food container 13, the bottom walls of which are spaced from the bottom and walls of the casing by inward projections 14 on the surface thereof, whereby an air passageway is formed entirely about the food container. The intermediate bottom portion of the food container 13 is inset to provide a transverse channelway, the walls 15 of the channelway being substantially perpendicular to the bottom of the device, and the channelway is open at its ends. The fuel for heating the compartment is disposed in the channelway in the form of an elongated block *f* and is supported on upwardly struck projections 16 of the casing bottom. The fuel block is held against movement in the channelway by upstanding spring arms 17 on the casing bottom carrying U-shaped clip portions 18 embracing the ends of the block. The walls of the channelway 15 serve to direct the current of air passing between the container 13 and casing directly against the fuel, whereby a positive combustion of the fuel is procured, and the walls receive direct heat radiation from the fuel, whereby to impart a maximum degree of heat to food within the container, it being appreciated that incomplete combustion may result from an accumulation of combustion gases about the fuel, if such gases are not carried off by a sufficient circulation. The fuel receiving channelway of the food container 13 also may serve as a partition dividing different foods within the container.

The food container 13 is provided with a pan-shaped cover 19 having an out-turned marginal flange portion which seats on the mouth of the container, and this pan-shaped cover receives in nested relation the beverage flask 20 of the device. A cup 21 telescopically engages over the mouth portion of the flask, serving to positively retain the cork 22 thereof, and occupying a minimum amount of space by reason of its position on the flask, it being noted that the dimensions of said cup and of the flask are such as to fit snugly within the pan-shaped cover, the marginal portion of the cover and the upper surface of the flask and cup lying substantially in the plane of the upper edges of the main casing walls 11. The cup carries suitable foldable handle members 23.

The cover for the heated food compartment forms also the casing for the cold food compartment and includes an insulated bottom 24 having upstanding wall portions 25 and depending marginal cover flange portions 26 which are held in spaced relation to the outer surfaces of the main casing wall by outstanding spacing projections 27 on said wall surfaces. The flask is provided with up-standing projections 28 engaging the upper casing bottom 24 and thus insuring a circulating air space over the entire upper surfaces of the flask, in communication with the side spaces, said projections 28 also holding the bottom 24 spaced above the edges of the main casing walls 11. This spacing action however is resiliently yieldable in nature by reason of the resiliency of the pan-shaped cover 19, insulated cover 24 and of the food container 13, particularly with respect to the bottom thereof, it being noted that the resiliency of said bottom and covers is contingent upon the inward spacing of the casing projections 14 and upstanding projections 28 from their edges. The combined cover and upper casing is secured to the main casing by headed studs 29 outstanding on the ends of the main casing and engageable through the apertures of hasp members 30 pivoted to the flange portions 26 of the cover casing. It is noted that the shanks of these studs are eccentric to their axes of rotation. Thus, the degree and the direction in which the studs are turned after insertion of their heads through the hasp openings will determine the relative spacing of the bottom 28 and the edges of the walls 11, in opposition to the resilient upward pressure of the container structure within the main casing, which holds all of the parts in snug relation. This adjustment of the cover with respect to the main casing thus affords a ready control for the combustion of the fuel, by varying the draft spaces of the device.

The end walls of the main casing are provided in their lower portion with series of draft openings 31, and passage of air through these openings is controlled by damper plates 32 carried on pins 33 having their knurled ends disposed outwardly of the casing. An arrangement is thus provided wherein a wide range of control is afforded to meet differing heating conditions which may be encountered, and if desired the draft openings 32 may be entirely closed, the air for combustion entering the space between the main casing and the upper casing.

From the above it will be seen that the heated chamber can be closed top and bottom and may be used in hot weather for keeping food cold.

A pan-shaped food container 34 is disposed within the upper casing and has its bottom end walls spaced from the bottom 24 and walls 25 by inward projections 35. A closed container 36 for semi-fluid cold food is disposed in one end portion of the container 34.

A cover 37 is provided for the upper casing, having depending marginal wall portions of greater dimensions than the walls 25 of the upper casing, whereby to loosely fit thereabout, and the walls 25 and cover walls are held in spaced relation by vertical outstanding ribs or projections 38 on the casing walls. The outer surfaces of the casing walls are preferably enameled, and these ribs 38 also prevent scratching of the casing wall surfaces by the cover walls, the ribs 38 being preferably of the same color throughout as the enamel whereby to present a harmonious appearance in case of scratching said ribs. The height of the walls of the cover 37 is considerably greater than the height of the casing walls 25, and thus the cover constitutes an extension section of the casing and may be raised or lowered on the casing to vary the capacity of the cold food compartments within a fairly wide range of adjustment. The cover 37 is held at various elevations by headed studs 39 on its end wall portions engageable in the apertures of hasps carried by the cover flange portions 26 of the upper casing, each of these hasps preferably comprising an inner section 40 pivoted to the cover flange and having pivotal connection with an outer hasp section 40ª, the stud receiving openings of the hasp section 40ª registering with the opening of the section 40 when folded thereupon, this folding of the hasp sections procuring a maximum neatness of appearance when it is not desired to extend the cover.

By the spacing of the walls of the cover 37 from the casing walls 25, and by the spacing of the food container 34 from the casing, it is seen that a free circulation of air is at all times maintained about the cold food, to maintain a maximum coldness thereof, and to carry off any heat which might possibly be transmitted through the insulated upper casing bottom 24, or transmitted by conduction through the metal jacketing. The cover 37 is provided with a longitudinal channel in its top adapted to receive a knife, fork and spoon, $a$, $b$ and $c$ respectively, and these articles are normally contained in the channel by a leaf spring 41 having one end portion pivoted to one side of the top of the cover 37 and having its other end portion bowed to engage the articles in the channel. A handle strap 42 is carried by fasteners 43 secured on the cover top and these fasteners also preferably mount swivel edges 44 to which may be secured a strap 45 for suspending the device from the shoulder.

Reviewing now the entire structure described, it is seen that an exceedingly compact and at the same time simple structure has been provided for containing a complete lunch, including hot and cold portions and for maintaining said portions at their desired temperatures, it being noted that both hot and cold food containers are afforded independent circulation of air for this purpose. It is further noted that access may be had to the cold food container without exposing the hot food container, and vice versa, it being further noted that the flask 20 may be removed to use with cold lunch between meal times without disturbing or exposing the food in the heated food container.

What is claimed is:

1. A heated receptacle for meals comprising a main casing, a fuel holder carried by the casing, a container in the casing having portions spaced from the adjacent portions of the casing, a cover for the casing, means for holding adjacent portions of the cover and casing in spaced relation whereby to permit circulation therebetween, and means for adjusting the space between the cover and the main casing.

2. A heated receptacle including means, an outer casing, fuel holding means in the casing, a container in the casing having portions spaced from the adjacent portions of the casing, a cover for the main casing spaced therefrom, members carried by the container and engageable with the cover, said container being yieldably supported in the main casing, and means for adjusting the position of the cover with respect to the main casing for varying the space therebetween.

3. A heated receptacle for meals comprising an outer casing, means for holding fuel in the casing, a removable container in the casing having portions spaced from the adjacent portions of the casing, a cover for the casing, hasp members on the cover provided with openings, and rotatable members on the casing having eccentric portions engageable in the openings to vary the relative position of the cover and casing upon rotation of said members.

4. A receptacle for meals including a casing, a container in the casing having portions spaced from adjacent portions of the casing, a cover for the casing having depending walls of greater dimensions than the walls of the casing and telescopically receiving said walls of the casing, and spacing projections between the walls of the casing and cover.

5. A receptacle for meals including a casing, a container in the casing having portions spaced from adjacent portions of the casing, a cover for the casing having depending walls of greater dimensions than the walls of the casing and telescopically receiving said walls of the casing, spacing projections between the walls of the casing and cover, and heat supply means in the casing.

6. A receptacle for meals including a casing, a container in the casing having portions spaced from adjacent portions of the casing, a cover for the casing having depending walls of greater dimensions than the walls of the casing and telescopically receiving said walls of the casing, spacing projections between the walls of the casing and cover, and means for holding the cover and casing in different relative positions to vary the capacity of the chamber formed thereby.

7. A heated receptacle for meals including a lower casing, an upper casing forming a cover for the lower casing, a cover for the upper casing, carrying means on the upper casing cover, fastening means connecting the upper and lower casings, and independent fastening means connecting the upper casing and its cover.

8. A receptacle for meals including a casing, a cover for said casing having a longitudinal portion upwardly offset to form a reinforcing channel, and means for holding cutlery in said channel.

In testimony that I claim the foregoing I have hereunto set my hand at Milwaukee, in the county of Milwaukee and State of Wisconsin.

JULIUS E. HEIMERL.